(12) United States Patent
Gu et al.

(10) Patent No.: US 8,995,156 B2
(45) Date of Patent: Mar. 31, 2015

(54) DC/DC CONVERTER WITH RESONANT CONVERTER STAGE AND BUCK STAGE AND METHOD OF CONTROLLING THE SAME

(71) Applicant: Eaton Corporation, Cleveland, OH (US)

(72) Inventors: Jack Gu, Shenzhen (CN); Yuefeng Yang, Shenzhen (CN); Yuehui Li, Shenzhen (CN)

(73) Assignee: Eaton Corporation, Cleveland, OH (US)

( * ) Notice: Subject to any disclaimer, the term of this patent is extended or adjusted under 35 U.S.C. 154(b) by 189 days.

(21) Appl. No.: 13/710,830

(22) Filed: Dec. 11, 2012

(65) Prior Publication Data

US 2014/0160799 A1 Jun. 12, 2014

(51) Int. Cl.
*H02M 3/24* (2006.01)
*H02M 3/156* (2006.01)
*H02M 3/337* (2006.01)
*H02M 1/00* (2006.01)
*H02M 7/48* (2006.01)

(52) U.S. Cl.
CPC ............ *H02M 3/156* (2013.01); *H02M 3/3376* (2013.01); *H02M 2001/007* (2013.01); *H02M 2007/4815* (2013.01)
USPC .......................................................... 363/95

(58) Field of Classification Search
USPC .......... 363/20, 21.01, 21.02, 95, 97; 323/265, 323/267, 273, 282, 283, 285
See application file for complete search history.

(56) References Cited

U.S. PATENT DOCUMENTS

| | | | |
|---|---|---|---|
| 7,518,263 B2 * | 4/2009 | Gan et al. | 307/32 |
| 8,587,963 B2 * | 11/2013 | Nan et al. | 363/21.02 |
| 2008/0055941 A1 * | 3/2008 | Victor et al. | 363/17 |
| 2008/0094860 A1 * | 4/2008 | Falk | 363/17 |
| 2010/0182803 A1 * | 7/2010 | Nan et al. | 363/21.02 |
| 2012/0081200 A1 * | 4/2012 | Silva | 336/20 |
| 2012/0081204 A1 * | 4/2012 | Garrity et al. | 336/221 |
| 2012/0081933 A1 * | 4/2012 | Garrity | 363/37 |
| 2012/0081934 A1 * | 4/2012 | Garrity et al. | 363/37 |
| 2013/0229834 A1 * | 9/2013 | Garrity et al. | 363/37 |
| 2014/0153290 A1 * | 6/2014 | Li et al. | 363/17 |

* cited by examiner

*Primary Examiner* — Adolf Berhane
(74) *Attorney, Agent, or Firm* — Eckert Seamans Cherin & Mellott, LLC; Nathaniel C. Wilks

(57) ABSTRACT

A direct current to direct current (DC/DC) converter includes a resonant converter stage, a buck stage, and a processor apparatus. The resonant converter stage includes a bridge circuit. The buck stage is configured to output an output voltage and an output current, is electrically connected in series with the resonant converter stage, and includes a buck switch. The processor apparatus is configured to sense the output voltage and the output current, and, based on the sensed output voltage and the sensed output current, to perform one of: (a) fixing a switching frequency of the bridge circuit to a predetermined maximum switching frequency and controlling the output voltage by controlling a duty cycle of the buck switch, and (b) fixing the duty cycle of the buck switch to a predetermined duty cycle and controlling the output voltage by controlling the switching frequency of the bridge circuit.

20 Claims, 5 Drawing Sheets

DC/DC CONVERTER WITH RESONANT CONVERTER STAGE AND BUCK STAGE AND METHOD OF CONTROLLING THE SAME

BACKGROUND

1. Field

The disclosed concept pertains generally to direct current to direct current (DC/DC) converters and, more particularly, to multi-stage DC/DC converters. The disclosed concept also pertains to methods of controlling DC/DC converters.

2. Background Information

A DC/DC converter is configured to receive an input direct current (DC) voltage and convert it into one or more output DC voltages. In many applications, such as electric vehicle chargers, a DC/DC converter must be able to provide a relatively wide output voltage range. For example, the electric vehicle charging voltage range required by the CHAdeMo specification is 50-500 VDC. In other words, the maximum voltage in the range is ten times the minimum voltage in the range.

One type of DC/DC converter is an LLC resonant converter. An LLC resonant converter is a type of resonant converter whose resonant frequency is determined by two inductive components and one capacitive component. LLC resonant converters provide high efficiency, low levels of EMI emissions, high power density, and low cost. However, in prior LLC resonant converter designs, increasing the output voltage range detrimentally affects the efficiency of the LLC resonant converter by causing a larger shunt current in the primary side, thus increasing conduction loss.

Some prior DC/DC converter designs have used a buck stage in conjunction with an LLC resonant converter stage to obtain a wider output range. In one prior configuration, a buck stage is added after the LLC resonant converter stage, thus allowing a wider output voltage range.

In such DC/DC converter designs, the output voltage of the LLC resonant converter stage is controlled by changing its switching frequency and the output voltage of the buck stage is controlled by changing its duty cycle. Two methods have been used to control the output voltage of the DC/DC converter in these designs. For example, if the required output voltage is 50-500 VDC and the maximum current is 30 A, a first method fixes the output voltage of the LLC resonant converter stage to 500 VDC regardless of the load and regulates the output voltage with the buck stage. With this method, the LLC resonant converter stage can be optimized to have a high efficiency. However, the buck stage must have a relatively wide output range of 50-500 VDC and must be able to handle power up to 15 kW. Due to its hard switching, the loss in the buck stage is large. Additionally, the buck stage must be designed for a power of 15 kW, thus increasing its cost.

In a second method, the output voltage of the LLC resonant converter stage has a regulation range of 310-500 VDC at any load from OA to 30 A. If the required output voltage is above 310 VDC, the duty of the buck stage is set to 100% and the output voltage is regulated by the LLC resonant converter stage. If the required output voltage is below 310 VDC, the output voltage of the LLC resonant converter stage is set to 310 VDC or some other value at which the LLC resonant converter stage has a relatively high efficiency and the output voltage is regulated by controlling the duty cycle of the buck stage. In this second method, the efficiency of the LLC resonant converter stage is lower than the efficiency of the LLC resonant converter stage of the first method. However, the buck stage regulates a narrower range of voltages and has a lower power rating. Although the second method is more efficient than the first method, there is room for further improvement in DC/DC converters.

SUMMARY

These needs and others are met by embodiments of the disclosed concept in which a DC/DC converter in which a processor apparatus is configured to perform one of: (a) fixing a switching frequency of a bridge circuit to a predetermined maximum switching frequency and controlling an output voltage by controlling a duty cycle of a buck switch, and (b) fixing the duty cycle of the buck switch to a predetermined duty cycle and controlling the output voltage by controlling the switching frequency of the bridge circuit.

In accordance with aspects of the disclosed concept, a direct current to direct current (DC/DC) converter comprises: a resonant converter stage configured to receive an input voltage, the resonant converter stage including a bridge circuit having a number of pairs of power switches; a buck stage configured to output an output voltage and an output current, the buck stage being electrically connected in series with the resonant converter stage and including a buck switch; and a processor apparatus configured to sense the output voltage and the output current, and, based on the sensed output voltage and the sensed output current, to perform one of: (a) fixing a switching frequency of the bridge circuit to a predetermined maximum switching frequency and controlling the output voltage by controlling a duty cycle of the buck switch, and (b) fixing the duty cycle of the buck switch to a predetermined duty cycle and controlling the output voltage by controlling the switching frequency of the bridge circuit.

Also in accordance with aspects of the disclosed concept, a method of controlling a DC/DC converter comprising a resonant converter stage including a bridge circuit having a number of pairs of power switches, and a buck stage electrically connected in series with the resonant converter stage and including a buck switch comprises: sensing an output voltage of the DC/DC converter; sensing an output current of the DC/DC converter; and based on the sensed output voltage and the sensed output current, performing one of: (a) fixing a switching frequency of the bridge circuit to a predetermined maximum switching frequency and controlling the output voltage of the DC/DC converter by controlling a duty cycle of the buck switch, and (b) fixing the duty cycle of the buck switch to a predetermined duty cycle and controlling the output voltage of the DC/DC converter by controlling the switching frequency of the bridge circuit.

Also in accordance with aspects of the disclosed concept, a non-transitory computer readable medium storing one or more programs, including instructions, which when executed by a computer, causes the computer to perform a method of controlling a DC/DC converter comprising a resonant converter stage including a bridge circuit having a number of pairs of power switches, and a buck stage electrically connected in series with the resonant converter stage and including a buck switch comprises: sensing an output voltage of the DC/DC converter; sensing an output current of the DC/DC converter; and based on the sensed output voltage and the sensed output current, performing one of: (a) fixing a switching frequency of the bridge circuit to a predetermined maximum switching frequency and controlling the output voltage of the DC/DC converter by controlling a duty cycle of the buck switch, and (b) fixing the duty cycle of the buck switch to a predetermined duty cycle and controlling the output voltage of the DC/DC converter by controlling the switching frequency of the bridge circuit.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

Figure 1:
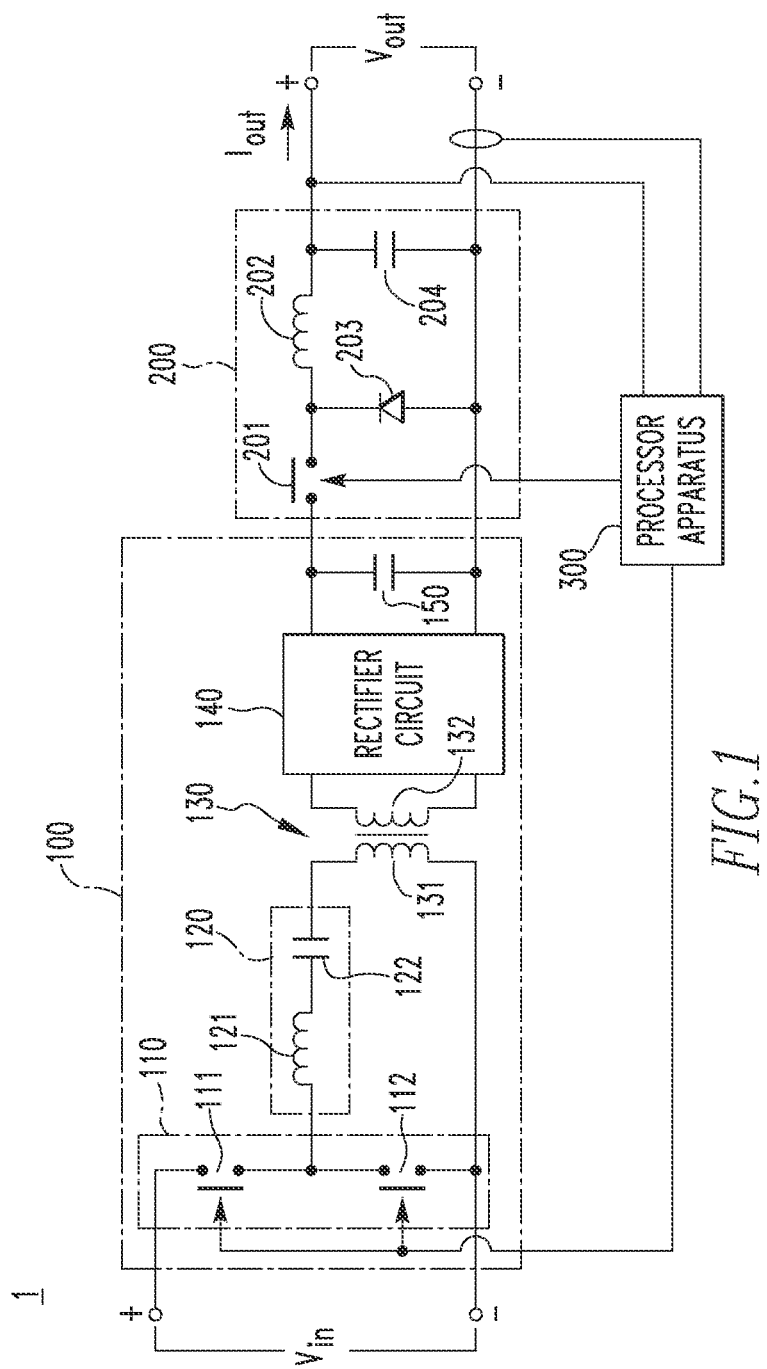
FIG. 1 is a circuit diagram of a DC/DC converter in accordance with an example embodiment of the disclosed concept.

Directional phrases used herein, such as, for example, left, right, front, back, top, bottom and derivatives thereof, relate to the orientation of the elements shown in the drawings and are not limiting upon the claims unless expressly recited therein.

As employed herein, the statement that two or more parts are "coupled" together shall mean that the parts are joined together either directly or joined through one or more intermediate parts.

As employed herein, the term "number" shall mean one or an integer greater than one (i.e., a plurality).

As employed herein, the statement that a component is on the "primary side of the DC/DC converter" and similar statements shall mean that the component is electrically connected, either directly or indirectly, to the primary winding of a transformer included in the DC/DC converter.

As employed herein, the statement that a component is on the "secondary side of the DC/DC converter" and similar statements shall mean that the component is electrically connected, either directly or indirectly, to the secondary winding of a transformer included in the DC/DC converter.

As employed herein, the term "switch" means any switch suitable for use in an electrical circuit. The term includes both mechanical type switches (e.g., without limitation, switches which physically separate contacts of the switch) and solid-state type switches (e.g., without limitation, transistors). The term also includes switch assemblies (e.g., without limitation, a transistor combined with a freewheel diode).

As employed herein, the term "processor" shall mean a programmable analog and/or digital device that can store, retrieve and process data; a controller; a control circuit; a computer; a workstation; a personal computer; a microprocessor; a microcontroller; a microcomputer; a central processing unit; a mainframe computer; a mini-computer; a server; a networked processor; or any suitable processing device or apparatus.

As employed herein, the phrase "predetermined maximum switching frequency of the bridge circuit" and similar phrases shall mean a predetermined frequency which is greater than the resonant frequency of a corresponding resonant DC/DC converter, and is the intended maximum switching frequency of the bridge circuit during normal operation of the corresponding DC/DC converter. The predetermined maximum switching frequency of the bridge circuit is not the maximum possible switching frequency of the bridge circuit or any switches such as power switches, thereof.

Referring to FIG. 1, a DC/DC converter 1 in accordance with one non-limiting example embodiment of the disclosed concept is shown. The DC/DC converter 1 includes a resonant converter stage 100 which receives an input voltage $V_{IN}$ and a buck stage 200 which outputs an output voltage $V_{OUT}$ along with an output current $I_{OUT}$. The DC/DC converter 1 also includes a processor apparatus 300 which senses the output voltage $V_{OUT}$ and output current $I_{OUT}$ and controls operations of the resonant converter stage 100 and the buck stage 200 based on the sensed output voltage $V_{OUT}$ and sensed output current $I_{OUT}$, which will be described in more detail below.

The example resonant converter stage 100 includes a bridge circuit 110, a resonant network 120, a transformer 130, a rectifier circuit 140, and a first filtering capacitor 150. The example bridge circuit 110 receives the input voltage $V_{IN}$ and drives the resonant network 120. The bridge circuit 110 is a half-bridge circuit which includes one pair of power switches 111,112. The processor apparatus 300 controls switching of the bridge circuit 110, and in particular, the processor apparatus 300 controls the switching frequency of the bridge circuit 110. A change in the switching frequency of the bridge circuit 110 causes a change in the gain of the resonant converter stage 100. Thus, the processor apparatus 300 is able to control the gain of the resonant converter stage 100 by controlling the switching frequency of the bridge circuit 110.

In the non-limiting example embodiment of FIG. 1, the resonant network 120 includes the series combination of a first inductor 121 and a first capacitor 122. The first inductor 121 may be a discrete component or it may be leakage inductance of the transformer 130. The resonant network 120 is electrically connected between the bridge circuit 110 and the transformer 130.

The transformer 130 includes a primary winding 131 and a secondary winding 132. The primary winding 131 of the transformer 130 is electrically connected to the resonant network 120. The transformer 130 also has a magnetizing inductance component. The magnetic inductance component may be caused by, for example and without limitation, a ferromagnetic core (not shown) of the transformer 130. The transformer 130 isolates the primary and secondary sides of the resonant converter stage 100 from each other.

The secondary winding 132 of the transformer 130 is electrically connected to a rectifier circuit 140. The secondary winding 132 of the transformer can be structured in any suitable manner such as, for example and without limitation, a single winding or double windings with a common tap. The rectifier circuit 140 rectifies the output of the secondary winding 132 of the transformer 130. The rectifier circuit 140 can be structured in any manner suitable to rectify the output of the secondary winding 132 of the transformer 130. For example and without limitation, the rectifier circuit 140 may be structured as a half-wave rectifier or a full-wave rectifier.

The first filtering capacitor 150 is electrically connected across the output of the resonant converter stage 100. The first filtering capacitor 150 smoothes (e.g., reduces unevenness of) the output voltage of the resonant converter stage 100.

The resonant converter stage 100 is configured as an LLC resonant converter. In an LLC resonant converter, the resonant frequency of the primary side is determined by two inductive components (e.g., without limitation, inductor 121 and the magnetizing inductance of the transformer 130) and a capacitance (e.g., without limitation, capacitor 122). However, it is contemplated that the principles of the disclosed concept can also be applied to other types of resonant converters. For example and without limitation, it is contemplated that resonant converter stage 100 can be modified to change the resonant converter stage 100 to an LCC resonant converter without departing from the scope of the disclosed concept. In an LCC resonant converter, the resonant frequency of the primary side is determined by one inductive component and two capacitive components. A capacitor (not shown) can be electrically connected in parallel with the primary winding 131 of the transformer 130 to convert the resonant converter stage 100 into an LCC resonant converter.

Additionally, it is contemplated that the resonant converter stage 100 can be structured as a series resonant converter (e.g., without limitation, the resonant network 120 includes an inductor 121 in series with a capacitor 122), a parallel resonant converter (e.g., without limitation, the resonant network 120 includes an inductor (not shown) and capacitor (not shown) in parallel with the primary winding 131 of the transformer 130), or a series parallel resonant converter (e.g., without limitation, the resonant network 120 includes an inductor 121 in series with a capacitor 122 and a capacitor (not shown) in parallel with the primary winding 131 of the transformer 130) without departing from the scope of the disclosed concept.

The buck stage 200 is provided in series connection with the resonant converter stage 100. The buck stage 200 includes a buck switch 201, an inductor 202, a diode 203, and a second filtering capacitor 204. The buck stage 200 receives the output voltage of the resonant converter stage 100 and outputs the output voltage $V_{OUT}$.

The buck switch 201 is electrically connected to the output of the resonant converter stage 100. The processor apparatus 300 controls switching of the buck switch 201. In particular, the processor apparatus 300 controls the duty cycle of the buck switch 201. A change in the duty cycle of the buck switch 201 causes a change in the output voltage $V_{OUT}$. In particular, reducing the duty cycle of the buck switch 201 reduces the output voltage $V_{OUT}$. Thus, the processor apparatus 300 is able to control the output voltage $V_{OUT}$ by controlling the duty cycle of the buck switch 201.

A first end of the inductor 202 is electrically connected to the buck switch 201 and an opposite second end of the inductor 202 is electrically connected to the output of the buck stage 200. The diode 203 is electrically connected between the first end of the inductor 202 and the negative output of the buck stage 200. The second filtering capacitor 204 is electrically connected across the positive and negative outputs of the buck stage 200.

As described above, the processor apparatus 300 senses the output voltage $V_{OUT}$ and output current $I_{OUT}$ and controls operations of the resonant converter stage 100 and the buck stage 200 based on the sensed output voltage $V_{OUT}$ and sensed output current $I_{OUT}$. In more detail, the processor apparatus 300 determines whether to operate in a first mode or a second mode based on the sensed output voltage $V_{OUT}$ and the sensed output current $I_{OUT}$. In the first mode, the processor apparatus 300 fixes the switching frequency of the bridge circuit 110 to a predetermined maximum switching frequency and controls the output voltage $V_{OUT}$ by controlling the duty cycle of the buck switch 201. The predetermined maximum switching frequency is a frequency that is selected to be higher than the resonant frequency of the resonant converter stage 100. The efficiency of the resonant converter stage 100 may be taken into consideration when the predetermined maximum switching frequency is taken into account such that the predetermined maximum switching frequency is a switching frequency at which the resonant converter stage 100 operates at a relatively high efficiency. In one example embodiment, the predetermined maximum switching frequency is about 1.75 times the resonant frequency of the resonant converter stage 100.

In the second mode, the processor apparatus 300 fixes the duty cycle of the buck switch 201 to a predetermined duty cycle (e.g., without limitation a 100% duty cycle) and controls the output voltage $V_{OUT}$ by controlling the switching frequency of the bridge circuit 110. When the duty cycle of the buck switch 201 is set to 100%, the power loss and voltage drop in the buck stage 200 is negligible.

To make the determination of whether to operate in the first mode or the second mode, the processor apparatus 300 determines a threshold voltage $V_{TH}$ corresponding to the sensed output current $I_{OUT}$ and compares the sensed output voltage $V_{OUT}$ to the threshold voltage $V_{TH}$. If the sensed output voltage $V_{OUT}$ is less than the threshold voltage $V_{TH}$, the processor apparatus 300 operates in the first mode and if the sensed output voltage $V_{OUT}$ is greater than or equal to the threshold voltage $V_{TH}$, the processor apparatus 300 operates in the second mode. Derivation of threshold voltages $V_{TH}$ corresponding to the sensed output currents $I_{OUT}$ will be described below in connection with FIGS. 3A and 3B.

Figure 2:
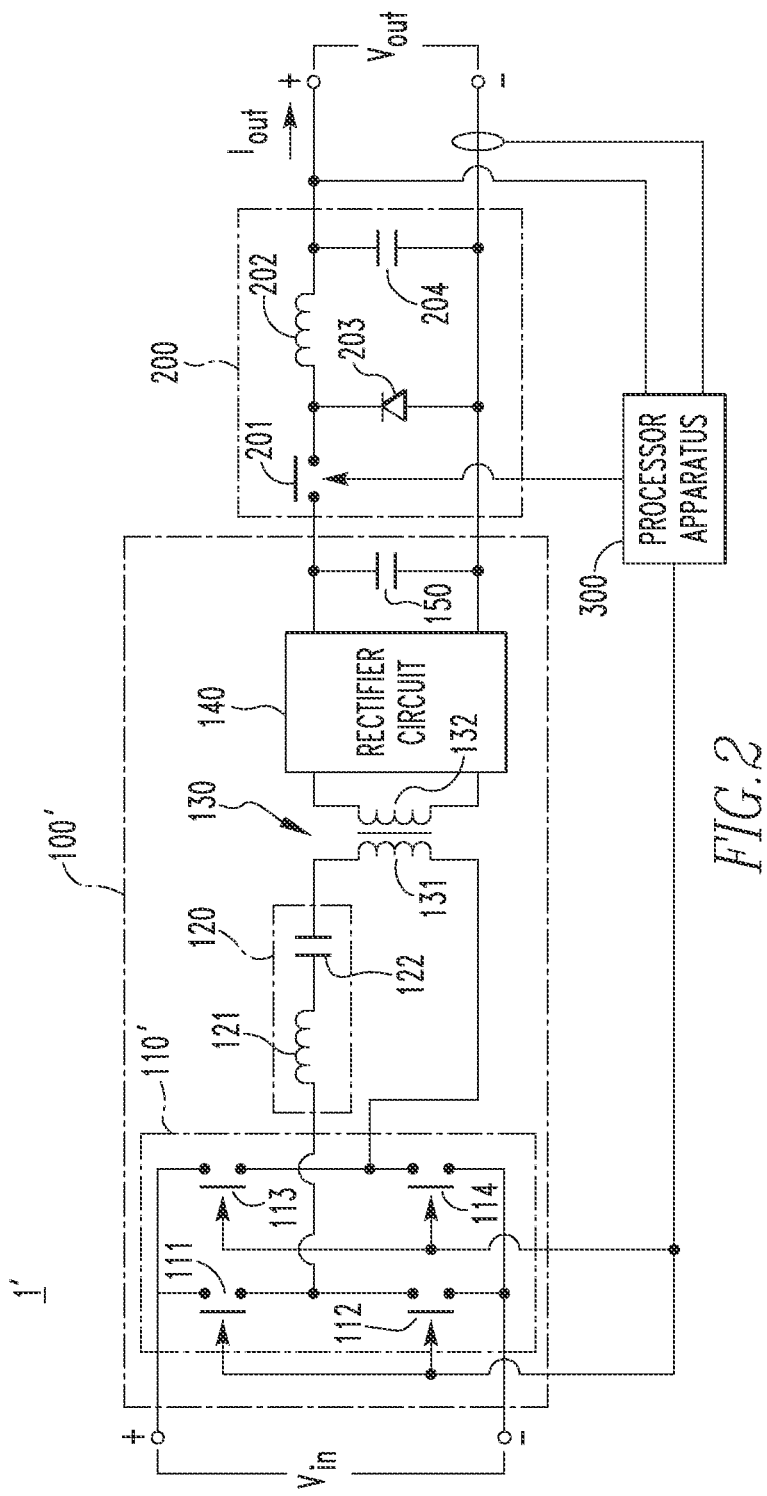
FIG. 2 is a circuit diagram of a DC/DC converter in accordance with another example embodiment of the disclosed concept.

Referring to FIG. 2, a circuit diagram of a DC/DC converter 1' in accordance with another example embodiment of the disclosed concept includes a resonant converter stage 100', a buck stage 200, and a processor apparatus 300. The DC/DC converter 1' of FIG. 2 is similar to the DC/DC converter 1 of FIG. 1, except that the bridge circuit 110' in the resonant converter stage 100' of the DC/DC converter 1' of FIG. 2 is a full-bridge circuit including two pairs of power switches 111,112,113,114.

Figure 3A:
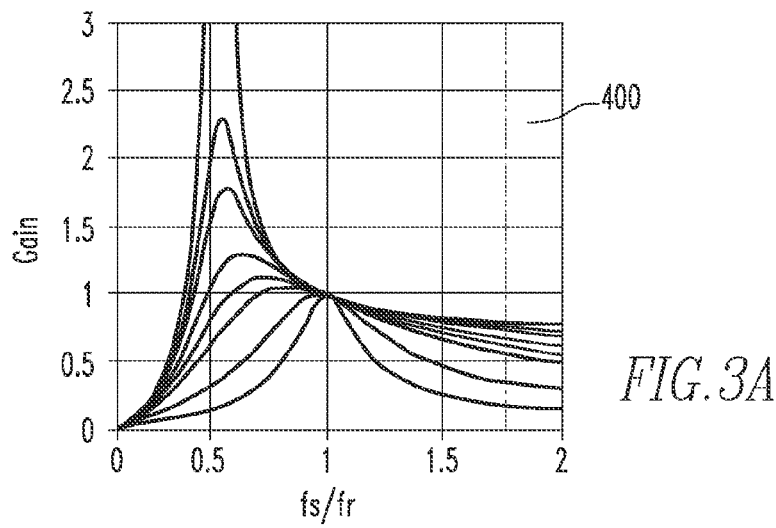
FIG. 3A is an example graph of a gain vs. frequency characteristic of a resonant converter stage.

Referring to FIG. 3A, a gain of the resonant converter stage 100 versus the switching frequency of the bridge circuit 110 for a number of output currents is shown. The gain of the resonant converter stage 100 is shown on the vertical axis and the ratio of the switching frequency $f_s$ of the bridge circuit 110 to the resonant frequency $f_r$ of the resonant converter stage 100 is shown on the horizontal axis. The gains for a number of output currents are shown on the graph. Additionally, an example predetermined maximum switching frequency 400 of the bridge circuit 110 is shown. At the predetermined maximum switching frequency 400, which is greater than the resonant frequency $f_r$ of the resonant converter stage 100, the gain of the resonant converter stage 100 decreases as the output current increases.

Figure 3B:
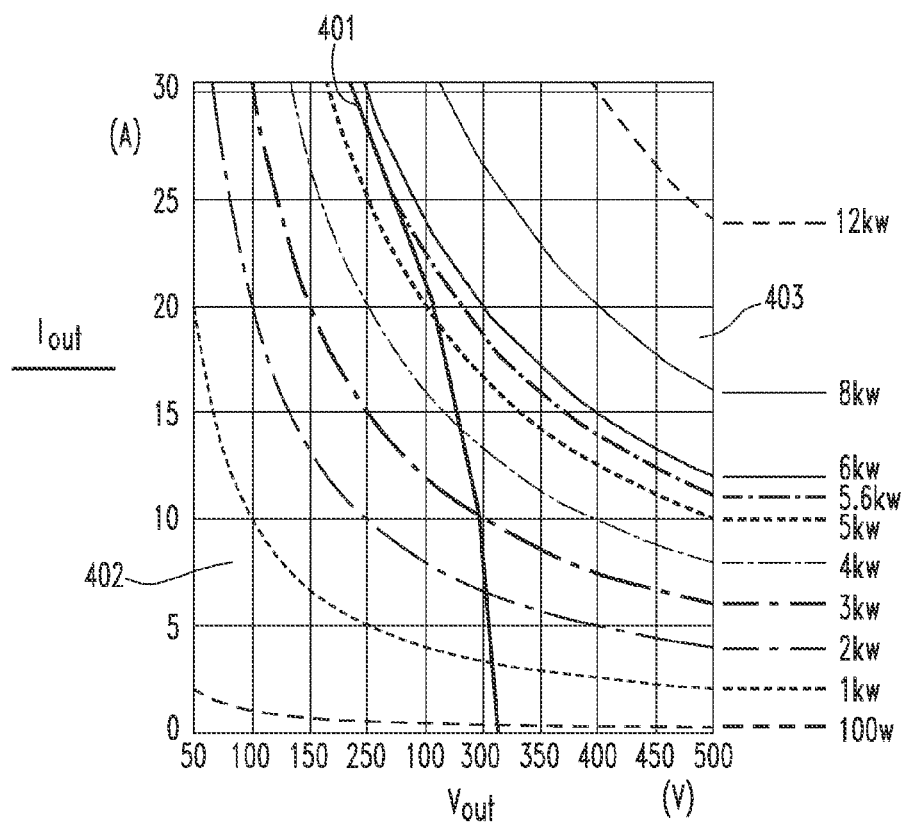
FIG. 3B is an example graph of an output current and an output voltage of a resonant converter stage operated at a predetermined maximum switching frequency.

FIG. 3B is a plot of the output current $I_{OUT}$ versus the output voltage $V_{OUT}$ when the switching frequency of the bridge circuit 110 is set to the predetermined maximum switching frequency 400. As shown in FIG. 3B, the output voltage $V_{OUT}$ decreases as the output current $I_{OUT}$ increases. A boundary curve 401 is shown in FIG. 3B. The boundary curve 401 includes the threshold voltages $V_{TH}$ respectively corresponding to each output current $I_{OUT}$. The boundary curve 401 can be used by the processor apparatus 300 to determine whether to operate in the first mode or the second mode. Equal power curves are also shown in FIG. 3B. Each point along a respective power curve represents the same amount of power. For example, each point along the 5.6 kw power curve represents an output power of 5.6 kw.

The area to the left of the boundary curve 401 (hereinafter referred to as the "buck area" 402) corresponds to the first mode and the area to the right of the boundary curve 401 (hereinafter referred to as the "resonant converter area" 403) corresponds to the second mode. If the output voltage $V_{OUT}$ and output current $I_{OUT}$ fall in the buck area 402, then the processor apparatus 300 operates in the first mode. If the output voltage $V_{OUT}$ and output current $I_{OUT}$ fall in the resonant converter area 403, then the processor apparatus 300 operates in the second mode.

In one example embodiment, the processor apparatus 300 makes the determination of whether the sensed output voltage $V_{OUT}$ and sensed output current $I_{OUT}$ fall in the buck area 402 or the resonant converter area 403, and thus determines whether to operate in the first mode or the second mode by determining the threshold voltage $V_{TH}$ corresponding to the sensed output current $I_{OUT}$ and comparing that threshold voltage $V_{TH}$ to the sensed output voltage $V_{OUT}$. If the sensed output voltage $V_{OUT}$ is less than the threshold voltage $V_{TH}$, then the processor apparatus 300 operates in the first mode, and if the sensed output voltage is greater than or equal to the threshold voltage $V_{TH}$, the processor apparatus operates in the second mode. However, it will be understood that any suitable method of determining whether the sensed output $V_{OUT}$ and sensed output current $I_{OUT}$ fall in the buck area 402 or the resonant converter area 403 may be employed without departing from the scope of the disclosed concept.

In one non-limiting example embodiment, the DC/DC converter 1 has a range of about 50-500 VDC (i.e., the output voltage range corresponding to the CHAdeMo specification) and a maximum output current of about 30 A. Additionally, when the bridge circuit 110 is switched at the predetermined maximum switching frequency, the output voltage of the resonant converter stage 100 ranges from about 310 VDC at 0 A to 180 VDC at 30 A. Under these conditions, the processor apparatus 300 operates in the first mode at any output voltage $V_{OUT}$ below about 180 VDC and in the second mode at any output voltage $V_{OUT}$ above about 310 VDC. For output voltages $V_{OUT}$ between about 180 VDC and about 310 VDC, the processor apparatus 300 determines which mode to operate in based on whether the output voltage is greater than or less than the threshold voltage $V_{TH}$ corresponding to the output current $I_{OUT}$.

In this example, the power that the buck stage 200 should be rated for is 5.6 kw. As shown in FIG. 3B, for a range of about 50-500 VDC and a maximum output current of about 30 A, the highest power curve that touches the buck area 402 is the 5.6 kw power curve. Thus, the power rating for the buck stage 200 is lower compared to previous control methods. As such, the cost and size of the buck stage 200 can be reduced compared to designs using previous control methods. Furthermore, the decreased input voltage results in lower switching losses in the buck switch 201, thus providing a more efficient design compared to designs using previous control methods. As a result, the DC/DC converters 1,1' provide relatively high power and wide voltage range at a relatively low cost, small size, and high efficiency.

Figure 4:
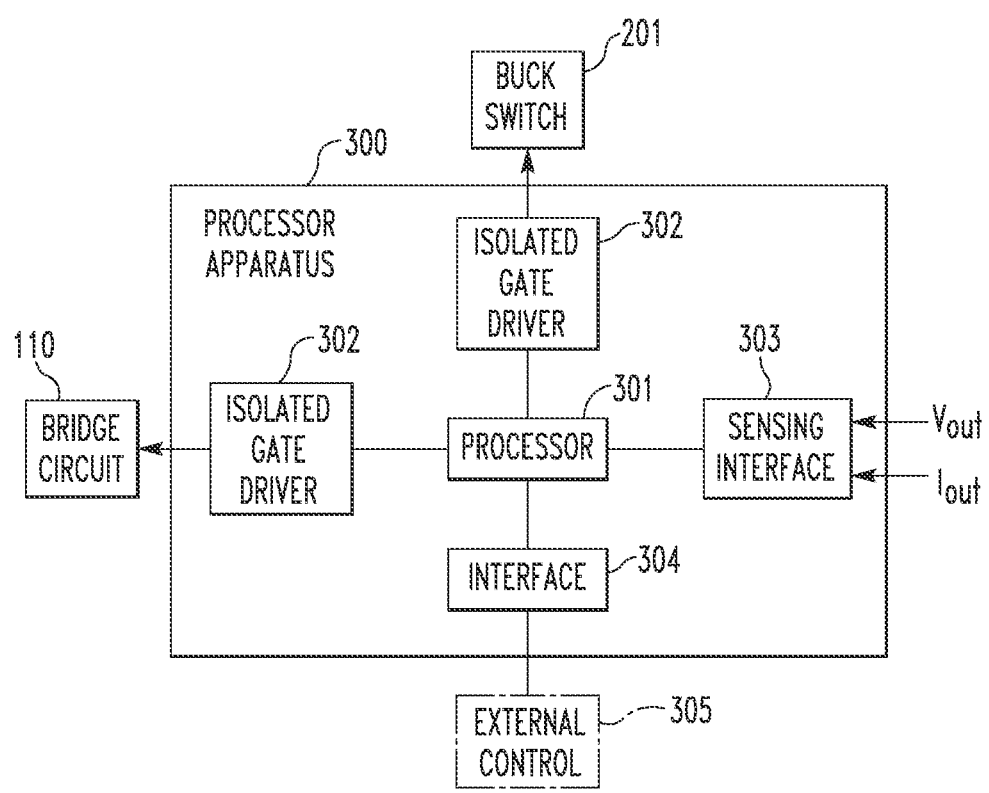
FIG. 4 is a block diagram of a processor apparatus in accordance with an example embodiment of the disclosed concept.

FIG. 4 is a block diagram of a processor apparatus 300 in accordance with one non-limiting example embodiment of the disclosed concept. The processor apparatus 300 includes a processor 301, isolated gate drivers 302, a sensing interface 303, and an interface 304.

The processor 301 determines whether to operate in the first mode or the second mode and controls the bridge circuit 110 and the buck switch 201 through the isolated gate drives 302 accordingly. The sensing interface 303 is configured to receive the output voltage $V_{OUT}$ and output current $I_{OUT}$ and to communicate information on the output voltage $V_{OUT}$ and output current $I_{OUT}$ to the processor 301. The interface 304 is configured to communicate with an external control device 305 which may, for example, instruct the processor 301 to set the output voltage $V_{OUT}$ to a certain level. The processor apparatus 300 may also include additional sensing interfaces (not shown) configured to receive the input voltage $V_{IN}$ and/or the output voltage of the resonant converter stage 100.

Figure 5:
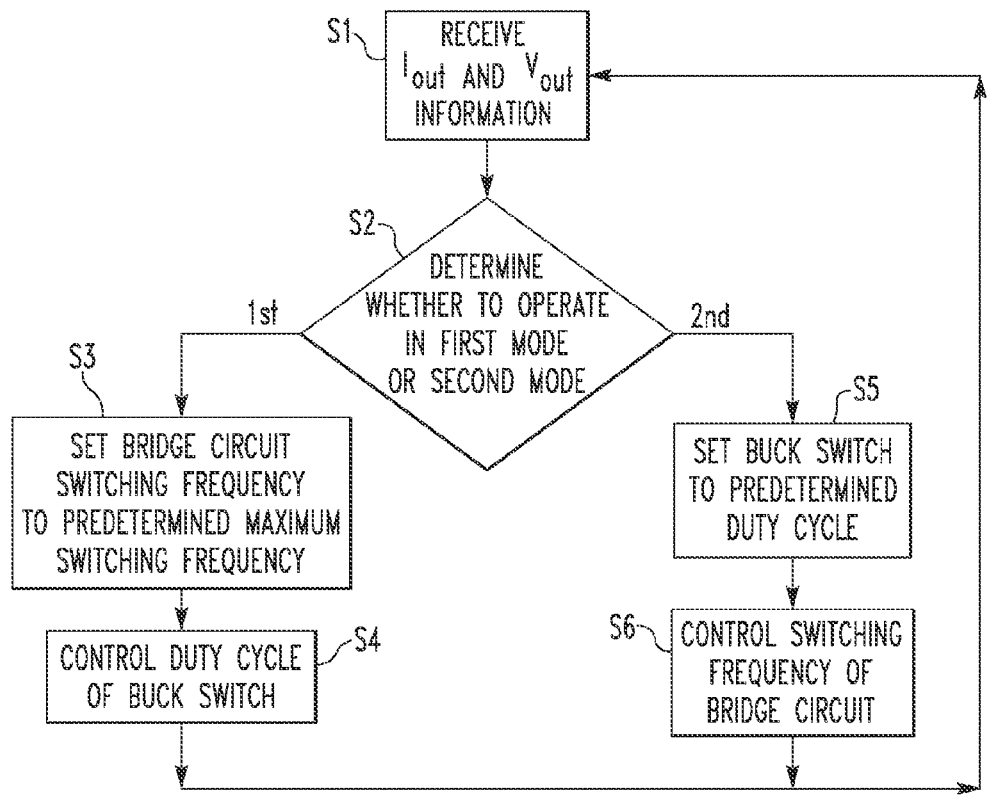
FIG. 5 is a flowchart of a method of controlling a DC/DC converter in accordance with an example embodiment of the disclosed concept.

FIG. 5 is a flowchart of a method of controlling the DC/DC converter 1 which may be implemented in, for example and without limitation, the processor apparatus 300. In operation S1, information of the output voltage $V_{OUT}$ and output current $I_{OUT}$ is received. In operation S2, it is determined whether to operate in the first mode or the second mode. If it is determined to operate in the first mode, operation S3 is performed in which the bridge circuit 110 switching frequency is set to the predetermined maximum switching frequency. In operation S4, the duty cycle of the buck switch 201 is controlled to control the output voltage $V_{OUT}$. The process then returns to operation S1.

If it is determined to operate in the second mode, operation S5 is performed in which the buck switch 201 is set to a predetermined duty cycle (e.g., without limitation, a 100% duty cycle). In operation S6, the switching frequency of the bridge circuit 110 is controlled to control the output voltage $V_{OUT}$. The process then returns to operation S1.

Figure 6:
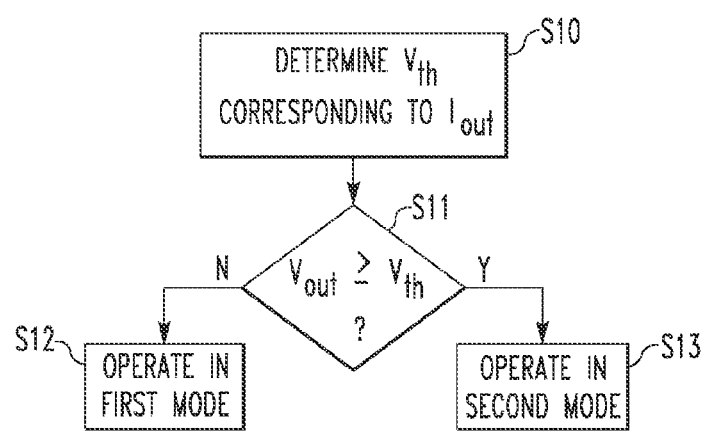
FIG. 6 is a flowchart of a method of determining whether to operate a buck stage or a resonant converter stage of a DC/DC converter in accordance with an example embodiment of the disclosed concept.

FIG. 6 is a flowchart showing the method of determining whether to operate in the first mode or the second mode. The method may be implemented in, for example and without limitation, the processor apparatus 300. In operation S10, the threshold voltage $V_{TH}$ corresponding to the sensed output current $I_{OUT}$ is determined. In operation S11, it is determined whether the sensed output voltage $V_{OUT}$ is greater than or equal to the threshold voltage $V_{TH}$. If the sensed output voltage $V_{OUT}$ is not greater than or equal to the threshold voltage $V_{TH}$, the operation S12 is performed in which the DC/DC converter 1 is operated in the first mode. If the sensed output voltage $V_{OUT}$ is greater than or equal to the threshold voltage $V_{TH}$, the operation S13 is performed in which the DC/DC converter 1 is operated in the second mode. As described above, in the first mode, the switching frequency of the bridge circuit 110 is set to a predetermined maximum switching frequency and the output voltage $V_{OUT}$ is controlled by controlling the duty cycle of the buck switch 201. In the second mode, the duty cycle of the buck switch 201 is fixed to a predetermined duty cycle (e.g., without limitation a 100% duty cycle) and the output voltage $V_{OUT}$ is controlled by controlling the switching frequency of the bridge circuit 110.

The disclosed concept can also be embodied as computer readable codes on a tangible, non-transitory computer readable recording medium. The computer readable recording medium is any data storage device that can store data which can be thereafter read by a computer system. Non-limiting examples of the computer readable recording medium include read-only memory (ROM), non-volatile random-access memory (RAM), CD-ROMs, magnetic tapes, floppy disks, disk storage devices, and optical data storage devices.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A direct current to direct current (DC/DC) converter comprising:
   a resonant converter stage configured to receive an input voltage, the resonant converter stage including a bridge circuit having a number of pairs of power switches;
   a buck stage configured to output an output voltage and an output current, the buck stage being electrically connected in series with the resonant converter stage and including a buck switch; and
   a processor apparatus configured to sense said output voltage and said output current, and, based on the sensed output voltage and the sensed output current, to perform one of: (a) fixing a switching frequency of the bridge circuit to a predetermined maximum switching frequency and controlling said output voltage by controlling a duty cycle of the buck switch, and (b) fixing the duty cycle of the buck switch to a predetermined duty cycle and controlling said output voltage by controlling the switching frequency of the bridge circuit.

2. The DC/DC converter of claim 1, wherein the predetermined duty cycle of the buck switch is a 100% duty cycle.

3. The DC/DC converter of claim 1, wherein the bridge circuit is a half-bridge circuit including one pair of power switches.

4. The DC/DC converter of claim 1, wherein the bridge circuit is a full-bridge circuit including two pairs of power switches.

5. The DC/DC converter of claim 1, wherein the resonant converter stage further includes a resonant network driven by the bridge circuit, a transformer having a primary winding and a secondary winding, the primary winding being electrically connected to the resonant network, a rectifier circuit electrically connected to the secondary winding, and a filtering capacitor electrically connected to the rectifier circuit.

6. The DC/DC converter of claim 1, wherein the buck stage further includes a diode electrically connected to the buck switch, an inductor electrically connected to the buck switch, and a filtering capacitor electrically connected to the inductor.

7. The DC/DC converter of claim 1, wherein the processor apparatus determines a threshold voltage corresponding to the sensed output current; wherein the processor apparatus compares the sensed output voltage to the determined threshold voltage; and wherein when the sensed output voltage is less than the determined threshold voltage, the processor apparatus performs said fixing the switching frequency of the bridge circuit to said predetermined maximum switching frequency and controlling said output voltage by controlling the duty cycle of the buck switch, and when the sensed output voltage is greater than the determined threshold voltage, the processor apparatus performs said fixing the duty cycle of the buck switch to said predetermined duty cycle and controlling said output voltage by controlling the switching frequency of the bridge circuit.

8. The DC/DC converter of claim 1, wherein the output voltage of the DC/DC converter has a range of about 50-500 VDC; and wherein the processor apparatus performs said fixing the switching frequency of the bridge circuit to said predetermined maximum switching frequency and controlling said output voltage by controlling the duty cycle of the buck switch when the output voltage is less than about 180 VDC and performs said fixing the duty cycle of the buck switch to said predetermined duty cycle and controlling said output voltage by controlling the switching frequency of the bridge circuit when the output voltage is greater than about 310 VDC.

9. The DC/DC converter of claim 1, wherein the resonant converter stage is structured as at least one of a series resonant converter, a parallel resonant converter, and a series parallel resonant converter.

10. The DC/DC converter of claim 1, wherein resonant converter stage is structured as at least one of an LLC resonant converter and an LCC resonant converter.

11. A method of controlling a DC/DC converter comprising a resonant converter stage including a bridge circuit having a number of pairs of power switches, and a buck stage electrically connected in series with the resonant converter stage and including a buck switch, the method comprising:
    sensing an output voltage of the DC/DC converter;
    sensing an output current of the DC/DC converter; and
    based on the sensed output voltage and the sensed output current, performing one of: (a) fixing a switching frequency of the bridge circuit to a predetermined maximum switching frequency and controlling the output voltage of the DC/DC converter by controlling a duty cycle of the buck switch, and (b) fixing the duty cycle of the buck switch to a predetermined duty cycle and controlling the output voltage of the DC/DC converter by controlling the switching frequency of the bridge circuit.

12. The method of claim 11, wherein the predetermined duty cycle of the buck switch is a 100% duty cycle.

13. The method of claim 11, further comprising:
    determining a threshold voltage corresponding to the sensed output current;
    comparing the sensed output voltage to the determined threshold voltage;
    performing said fixing the switching frequency of the bridge circuit to said predetermined maximum switching frequency and controlling the output voltage of the DC/DC converter by controlling the duty cycle of the buck switch when the sensed output voltage is less than the determined threshold voltage; and
    performing said fixing the duty cycle of the buck switch to said predetermined duty cycle and controlling the output voltage of the DC/DC converter by controlling the switching frequency of the bridge circuit when the sensed output voltage is greater than the determined threshold voltage.

14. The method of claim 11, further comprising:
    performing said fixing the switching frequency of the bridge circuit to said predetermined maximum switching frequency and controlling the output voltage of the DC/DC converter by controlling the duty cycle of the buck switch when the output voltage is less than about 180 VDC; and
    performing said fixing the duty cycle of the buck switch to said predetermined duty cycle and controlling the output voltage of the DC/DC converter by controlling the switching frequency of the bridge circuit when the output voltage is greater than about 310 VDC,
    wherein the output voltage of the DC/DC converter has a range of about 50-500 VDC.

15. The method of claim 11, wherein the resonant converter stage is structured as at least one of a series resonant converter, a parallel resonant converter, and a series parallel resonant converter.

16. The method of claim 11, wherein resonant converter stage is structured as at least one of an LLC resonant converter and an LCC resonant converter.

17. A non-transitory computer readable medium storing one or more programs, including instructions, which when executed by a computer, causes the computer to perform a method of controlling a DC/DC converter comprising a resonant converter stage including a bridge circuit having a number of pairs of power switches, and a buck stage electrically connected in series with the resonant converter stage and including a buck switch, the method comprising:
   sensing an output voltage of the DC/DC converter;
   sensing an output current of the DC/DC converter; and
   based on the sensed output voltage and the sensed output current, performing one of: (a) fixing a switching frequency of the bridge circuit to a predetermined maximum switching frequency and controlling the output voltage of the DC/DC converter by controlling a duty cycle of the buck switch, and (b) fixing the duty cycle of the buck switch to a predetermined duty cycle and controlling the output voltage of the DC/DC converter by controlling the switching frequency of the bridge circuit.

18. The non-transitory computer readable medium of claim 17, wherein the predetermined duty cycle of the buck switch is a 100% duty cycle.

19. The non-transitory computer readable medium of claim 17, wherein the method further comprises:
   determining a threshold voltage corresponding to the sensed output current;
   comparing the sensed output voltage to the determined threshold voltage;
   performing said fixing the switching frequency of the bridge circuit to said predetermined maximum switching frequency and controlling the output voltage of the DC/DC converter by controlling the duty cycle of the buck switch when the sensed output voltage is less than the determined threshold voltage; and
   performing said fixing the duty cycle of the buck switch to said predetermined duty cycle and controlling the output voltage of the DC/DC converter by controlling the switching frequency of the bridge circuit when the sensed output voltage is greater than the determined threshold voltage.

20. The non-transitory computer readable medium of claim 17, wherein the method further comprises:
   performing said fixing the switching frequency of the bridge circuit to said predetermined maximum switching frequency and controlling the output voltage of the DC/DC converter by controlling the duty cycle of the buck switch when the output voltage is less than about 180 VDC; and
   performing said fixing the duty cycle of the buck switch to said predetermined duty cycle and controlling the output voltage of the DC/DC converter by controlling the switching frequency of the bridge circuit when the output voltage is greater than about 310 VDC,
   wherein the output voltage of the DC/DC converter has a range of about 50-500 VDC.

* * * * *